Patented Aug. 23, 1932

1,872,756

UNITED STATES PATENT OFFICE

MAX ALBERT KUNZ, OF MANNHEIM, AND KARL KOEBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

MANUFACTURE OF MS-ANTHRADIANTHRONES

No Drawing. Application filed December 11, 1928, Serial No. 325,385, and in Germany December 31, 1927.

The present invention relates to an improvement in the manufacture of ms-anthradianthrone or derivatives thereof.

It has been proposed elsewhere to produce vat dystuffs by converting 2.2'-dimethyl-ms-benzdianthrone or its derivatives into allo-ms-naphthodianthrones by alkaline condensing agents, which products part with two atoms of hydrogen when treated with acid condensing agents in acid solution or under the influence of light, and are converted into new vat dyestuffs which have been termed ms-anthradianthrones. These last-named dyestuffs are also formed by treating with alkaline condensing agents the 2.2'-dimethyl ms-naphthodianthrones obtained from 2.2'-dimethyl-ms-benzdianthrones by acid condensation.

We have now found that the valuable ms-anthradianthrones of which the unsubstituted compound probably corresponds to the formula:

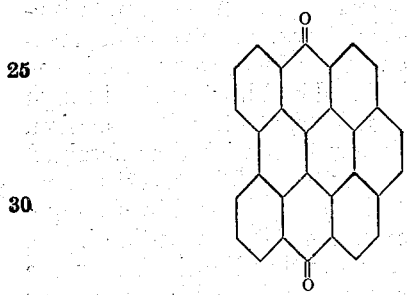

are also obtained in a simple manner, and one easily worked on a technical scale, by treating allo-ms-naphthodianthrone, probably corresponding to the formula:

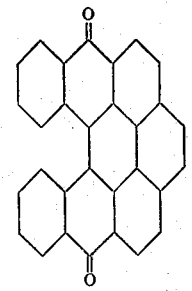

or its derivatives with caustic alkalies, under severe conditions, such as high temperatures which should be at least about 230° C., with, if desired, an addition of an oxidizing agent, such as alkali metal nitrates or manganese dioxide. The special advantage of the present invention over the above mentioned process for the preparation of ms-anthradianthrones consists in the fact that there is no need for the allo-ms-naphthodianthrones to be first prepared as such, but that the preparation of the allo-ms-naphthodianthrones by alkaline condensation of 2.2'-dimethyl-ms-benzdianthrone can be combined with that of the ms-anthradianthrones, so that the ms-anthradianthrones can be prepared direct, in one operation, from 2.2'-dimethyl-ms-benzdianthrones, by treatment with caustic alkalies. For example, 2.2'-dimethyl-ms-benzdianthrone is first heated with alcoholic caustic potash at between 170° C. and 175° C., the reaction temperature being raised from about 250° to 280° C. after the alcohol has been distilled off. The 2.2'-dimethyl-ms-benzdianthrone may also be subjected directly to severe treatment with caustic alkalies, for example, at about from 250° to 280° C. whereby ms-anthradianthrone is directly obtained. The vat dyestuff obtained from the 2.2'-dimethyl-ms-benzdianthrone in both cases corresponds in its properties to the ms-anthradianthrone obtained by treating allo-ms-naphthodianthrone with aluminum chloride at between 150° and 155° C. Very good yields are obtained with the present process.

The following examples will further illustrate the nature of the said invention which, however, is not limited thereto. The parts are by weight.

*Example 1*

400 parts of allo-ms-naphthodianthrone obtainable by boiling 2.2'-dimethyl-ms-benzdianthrone dissolved in nitro-benzene with barium oxide, are stirred into 2000 parts of fused caustic potash at from 220° to 225° C. The temperature is then raised to from 270° to 280° C., and stirring is continued until a sample of the reaction mixture dissolves to a blue violet solution in concentrated sulphuric acid, which occurs at the end of several hours. The melt is then cooled and taken up with hot water, the resulting dyestuff being completely precipitated by boiling or by blowing air through the solution, and then filtered with suction, washed until neutral and dried. The reaction probably proceeds according to the following formulæ:

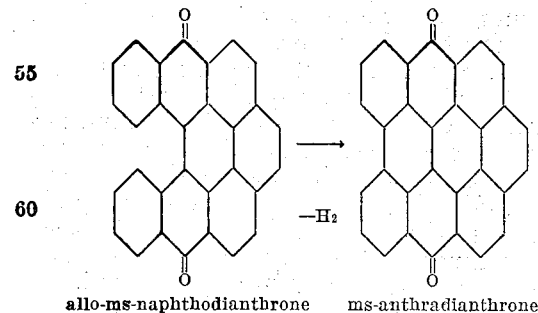

allo-ms-naphthodianthrone    ms-anthradianthrone

The dyestuff obtained in an excellent yield is in a very pure state, dissolves to a violet solution in concentrated sulphuric acid, gives strong golden yellow dyeings on cotton from a blue violet vat, and can be obtained in the form of small brownish yellow acicular crystals from solvents of high boiling point, such as nitrobenzene. Its properties therefore agree with those of the ms-anthradianthrone obtained according to the process mentioned above.

*Example 2*

400 parts of 2.2'-dimethyl-ms-benzanthrone are stirred into a melt of 2000 parts of caustic potash and 2000 parts of alcohol, at from 115° to 120° C. The temperature is then raised to from 140° to 145° C. and stirring is continued at that temperature for several hours. After distilling off the alcohol, the temperature is raised to 280° C. and is maintained at that level until a sample of the reaction product gives a blue violet solution in concentrated sulphuric acid. The melt is then allowed to cool down a little and, after being taken up with hot water, is treated as described in the foregoing example. The resulting dyestuff is identical with that obtained according to the said example. The reaction probably proceeds according to the following formulæ:

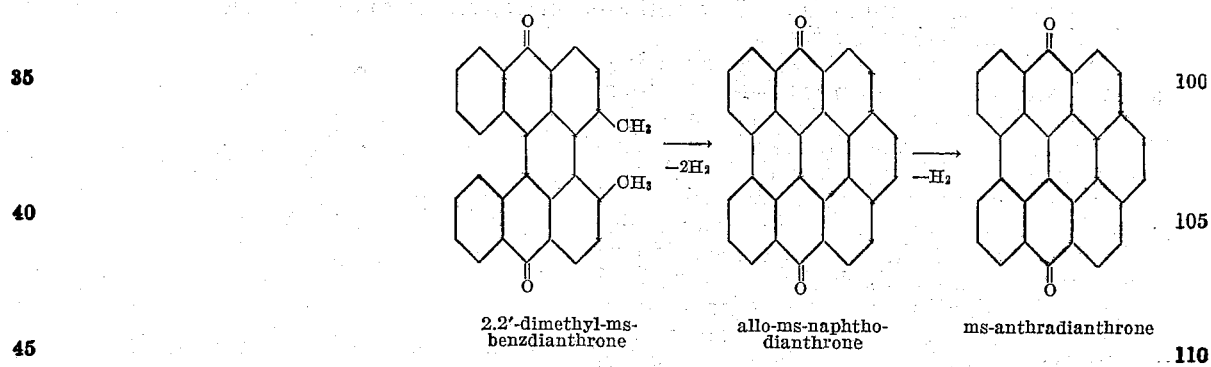

2.2'-dimethyl-ms-benzdianthrone    allo-ms-naphthodianthrone    ms-anthradianthrone

*Example 3*

40 parts of 2.2'-dimethyl-ms-benzdianthrone are introduced at about 250° to 260° C. into a melt of 250 parts of 85 per cent caustic potash and the melt is heated at about between 250° and 280° C. until a sample furnishes a pure violet vat. The reaction mass is then taken up with water, and the dyestuff precipitated by blowing air through the solution and filtered with suction. The dyestuff is identical with that obtained according to example 1. The reaction proceeds either by the way indicated in Example 2, or from 2.2'-dimethyl-ms-benzdianthrone directly to the ms-anthradianthrone by the elimination of 3 molecules of hydrogen, or by way of the intermediately formed 2.2'- dimethyl-ms-naphthodianthrone in accordance with the following formulae:

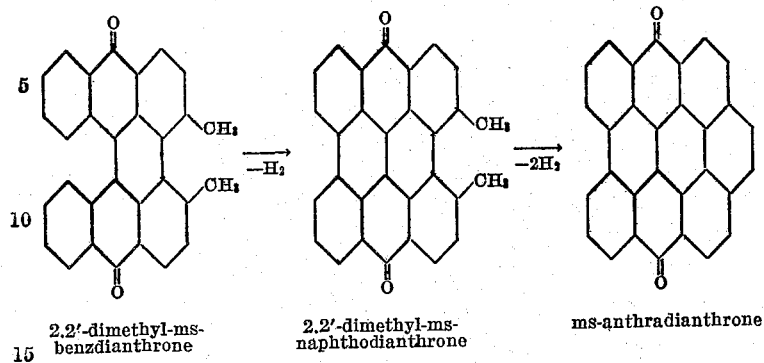

2.2′-dimethyl-ms-benzdianthrone    2.2′-dimethyl-ms-naphthodianthrone    ms-anthradianthrone

What we claim is:
1. A process of producing ms-anthradianthrones, which comprises subjecting an allo-ms-naphthodianthrone to caustic alkali fusion at temperatures of at least 230° C.
2. A process of producing ms-anthradianthrones, which comprises subjecting a 2.2′-dimethyl-ms-benzdianthrone to caustic alkali fusion at temperatures of at least 230° C.
3. A process of producing ms-anthradianthrones, which comprises subjecting a 2.2′-dimethyl-ms-benzdianthrone to caustic alkali fusion at temperatures between about 250 and 280° C.
4. A process of producing ms-anthradianthrone, which comprises subjecting 2.2′-dimethyl-ms-benzdianthrone to caustic alkali fusion at temperatures between about 250 and 280° C.

In testimony whereof we have hereunto set our hands.

MAX ALBERT KUNZ.
KARL KOEBERLE.